Sept. 30, 1969 G. J. BROWN 3,470,330

TELEPHONE BACKBOARD

Filed June 23, 1966

INVENTOR
George J. Brown.
BY
H. F. Johnston
ATTORNEY

1

3,470,330

TELEPHONE BACKBOARD

George J. Brown, 22 Grandview Ave., Waterbury, Conn. 06708

Filed June 23, 1966, Ser. No. 559,902

Int. Cl. H04m 1/04

U.S. Cl. 179—146 13 Claims

ABSTRACT OF THE DISCLOSURE

The invention pertains to a backboard for mounting a telephone upon a support wall and one that is designed to be attached permanently to the wall and left there regardless of the number of times the telephone is changed, or the color of the wall is changed, and is provided with features adapting it for use with a variety of support wall structures and different telephones. Also an adaptor frame is provided suitably interfitted with the backboard and is the only part that needs to be exchanged any time a telephone or wall color is changed.

This invention relates to support mountings for telephones, and particularly one that is used to support a wall-type telephone on a vertical wall.

One of the faults of the present backboards is that each time a wall-type telephone is changed because of color of the telephone or of the wall to which it is attached, or for other reasons, it is necessary that the old backboard be removed and a new one replaced to harmonize with the color of the telephone and/or the wall to which the telephone is to be attached.

The principal object of my invention is to provide a backboard which can be left on the wall as a permanent fixture regardless of the number of times the telephone and/or the color of the wall is changed.

In practice, there are now in use several sizes of wall-type telephones, and another object of my invention is to provide a wall-mounting consisting of a backboard and an adaptor frame designed so that it will accommodate these telephones.

Accordingly, along with a permanent backboard, I propose to use an adaptor frame which interfits either with the permanent backboard or becomes an extension of the wall of the telephone housing that is being hung. This adaptor frame will, of course, harmonize with the color of the telephone selected, and it is the only element which has to be replaced whenever a change is made to the color of the support wall or to the telephone, either of which may be changed for one reason or another.

In the present backboards, there are only six predetermined positioned holes through which screws are inserted to mount the backboard upon a wall. In practice, it has been found that with six holes, it is difficult to hit a stud or lath into which the crews should be fixed in order to properly mount and support the backboard.

Another of my invention is to provide elongated biased or diverging slots in the backboard through which the attaching screws may be inserted. This construction affords an infinite number of positions—both laterally and longitudinally—for positioning the screws so as to ensure that somewhere along the axis of the diverging slots, the screws will be screwed into a lath or a stud.

A further object is to provide a means in the form of an adjustable cross-bar whereby the backboard may be attached directly to an outlet box when one is used to join the lead-in wires to the telephone wires.

The full nature of the invention, along with other objects and various advantages thereof, will be more apparent from a consideration of the following description when read in connection with the accompanying drawings, in which

2

Figures 1, 2, 3, 4, 5, 6, 7, 8, 9, 10, 11:
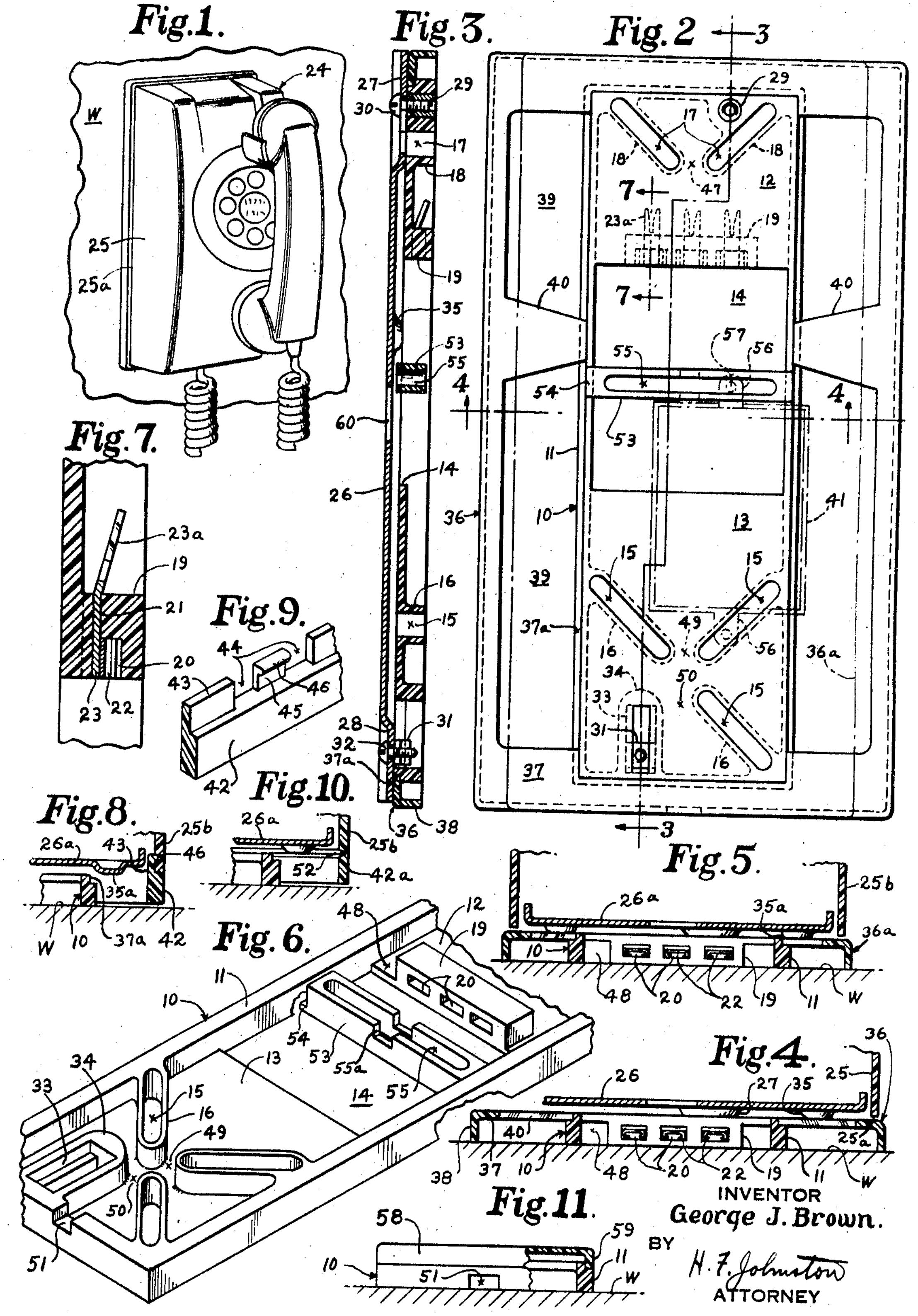
FIG. 1 is a perspective view of a conventional wall-type telephone making use of my adaptor frame.
FIG. 2 is a plan view of the backboard and assembled adaptor frame of the larger size, embodying my invention.
FIG. 3 is a longitudinal sectional view of the backboard taken along line 3—3 of FIG. 2 and showing the conventional telephone base plate attached thereto.
FIG. 4 is a transverse sectional view taken along line 4—4 of FIG. 2, adding a telephone base plate and also a portion of the telephone casing wall positioned thereupon, but omitting the adjustable cross-bar.
FIG. 5 is a view similar to FIG. 4, but showing the smaller size adaptor frame.
FIG. 6 is a perspective view from the underside of a portion of the backboard, per se.
FIG. 7 is a longitudinal fragmentary sectional view on a larger scale taken along line 7—7 of FIG. 2, showing one of the connecting jacks.
FIG. 8 is a fragmentary transverse sectional view showing a modified construction.
FIG. 9 is a perspective view of a portion of the adaptor frame of the modified construction.
FIG. 10 is a view similar to FIG. 8 showing another modified construction.
FIG. 11 is an end view of the backboard with an ornamental cover member attached thereto, and showing a portion in section.

Referring now to the drawing, the mounting for a wall-type telephone consists of a rectangular shaped backboard 10 and an adaptor frame 36. The backboard 10 is in the form of a rectangular shaped frame or marginal rim 11 integral with upper and lower panels 12 and 13, separated by a relatively large square opening 14. The lower panel 13 is provided with three diverging slots 15 surrounded by extension flanges 16 projecting from the underside of the lower panel 13. Similarly, the upper panel 12 is provided with two diverging slots 17 and extension flanges 18. These diverging slots 15 and 17, with their extension flanges 16 and 18, are to accommodate the screws by means of which the backboard 10 may be attached to any vertical support wall W. The slots 15 and 17 allow greater range for positioning the attaching screws in both a horizontal and vertical location so as to ensure that the screws can hit a stud or lath rather than become anchored only in the plaster as is often the case in the old backboards with a limited number of screw holes.

In order to facilitate making connections between the lead-in wires and the telephone wires, an elongated terminal block 19 depends from the underside of the upper panel 12 adjacent the opening 14 and is provided with three recesses 20 and connecting slots 21. Socket type spring clips 22 are positioned within the recesses 20 and these clips are welded to conductor bars 23 extending through the slots 21. The conductor bars 23 terminate in biased clip-type terminal connectors *23a* to which the lead-in wires may be connected by a simple slip-in connection (see FIG. 7). The recesses 20 with their clips 22 are positioned to be readily accessible from the square opening 14 so that the telephone wires with their usual spade tips can be easily inserted into the clips 22.

A conventional wall-type telephone is illustrated in FIG. 1 showing the usual casing 24 with sidewalls 25 having a rearmost terminal edge *25a*. The interior works of the telephone are all supported on the usual base plate 26. This plate 26 is formed at its upper and lower ends with outward projections 27 and 28 having keyhole slots therein (see FIG. 3). In the conventional telephone base plate, it is customary to have a keyhole slot in the upper projection 27 on a vertical axis while the keyhole slot in the lower projection 28 is on a horizontal axis.

It is at these keyhole projections that the base plate 26 is removably attached to the backboard 10 by suitable screws in the following manner.

A threaded bushing 29 is embedded in the molded material of the backboard as seen in FIGS. 2 and 3, and a round-head screw 30 initially is threadedly engaged in said bushing. At the lower end of the backboard, an adjustable clip nut 31 (to be more fully described later) is provided having a round-head screw 32 loosely engaged therein. In attaching the telephone base plate 26 to the backboard 10, the upper keyhole slot in the projection 27 is aligned and assembled over the head of screw 30 and then slipped downwardly. Next, the keyhole slot in the lower projection 28 will be aligned and assembled over the head of the screw 32. Then the base plate 26 will be swung into a vertical position and finally, the screws 30 and 32 will be tightened.

Inasmuch as my support mounting is designed to accommodate telephones of two different sizes, it is conceivable that the base plate of the small telephone will be of less length than the larger telephone requiring the keyhole projections to be closer together. Therefore, the attachment for the lower section of the base plate 26 is different from its upper section. To this end, there is provided an adjustable clip nut 31, previously mentioned, that is slidably fitted into a shouldered channel 33 arranged in a vertical axis. It is into this clip nut 31 that the screw 32 is initially loosely fitted.

The base plate 26 is also formed with projecting nubs 35 located on opposite sides near the mid-section of said plate. These nubs 35 heretofore were adapted to bear against the exposed face of the backboard. In the present invention, it will be observed that the location of the nubs 35 is such that they are positioned outside the width of the present backboard 10 for reasons as will appear later.

Heretofore, the size of the conventional backboard was slightly larger all around than the telephone casing, and the terminal edge **25*a* of the casing wall 25 was disposed in relatively close proximity to the backboard. In the present invention, since the backboard is of a size somewhat smaller than the overall size of the telephone casing, and therefore, to close the space between the telephone casing and the wall to which it is attached, an adaptor frame 36** is provided.

The frame 36 has an outside dimension substantially the same as the telephone casing, or preferably, slightly larger, and consists of a face plate 37 having a surrounding dependent flange 38. The inner edge of the face plate 37 defines generally a rectangular opening, which edge is adapted to fit snugly into a complementary recess **37*a* circumventing the upper edge of the backboard 10. If desired to reduce the weight and to save material, the face plate 37 may be provided with a series of cut-outs 39, preferably in such a manner as to leave a pair of opposed inwardly extending lugs 40. These lugs should be positioned so as to be in alignment with the nubs 35 of the base plate 26. The frame 36 as shown in FIGS. 2, 3 and 4, is for the larger size telephone so that when the telephone base plate 26 is attached to the backboard 10 as explained above, the keyhole projections 27 and 28 are so arranged that a portion of them will rest on the top surface of the face plate 37 as shown in FIG. 3, and the nubs 35 will likewise rest upon the lugs 40, thus serving to hold the adaptor frame 36 in place upon the backboard 10**.

FIG. 5 discloses an adaptor frame **36*a* dimensioned to accommodate the smaller size telephone, the casing walls being indicated at 25*b* and the frame 36*a* fits the same backboard 10 as used for the larger telephone. The base plate 26*a* for the small telephone will be attached to the backboard in the same manner as the larger base plate 26 and likewise, will be provided with keyhole projections and nubs for bearing against the face plate 37 and inward lugs 40 of the adaptor frame 36*a* for holding the latter in place upon the backboard 10. The width of the smaller size adaptor frame 36*a*** is indicated by the dot-and-dash outline in FIG. 2.

The manner of mounting the backboard and the telephone to a vertical wall is as follows: The telephone cables or lead-in wires are usually lead up between the wall partitions and out through openings at the position the telephone is to be hung. In some cases, the lead-in wires may be routed through an outlet box 41 shown in dot-and-dash outlines in FIG. 2. The lead-in wires or connectors from the outlet box are first joined to the terminal connector **23*a* merely by a slip-fit by forcing the wires into the forked prongs of said connectors. The backboard 10 is next attached to the wall by a wood or sheet metal screw passing through any one of the lower set of inclined slots 15 and another screw passes through any one of the upper set of inclined slots 17**. Inasmuch as the backboard is permanent, it may also be attached by contact cement or any other adhesive to the support wall.

The telephone wires (usually three in number) may be guided out through any one of the several exit openings provided in the base plate 26, one of which is shown at 60 (FIG. 3). These wires are usually provided with spade tips which are readily slipped into the spring clips 22 of the connector bars 23, and then the base plate 26 secured to the back of the telephone casing may be attached to the backboard 10 as explained above. It will thus be evident that by connecting the lead-in wires to the terminal connectors **23*a*** at the underside of the backboard as explained above, there will never be any hanging or loose wires projecting from an outlet box or hole in the wall whenever the telephone is removed from the wall.

In positioning the backboard on a wall, experience has taught that an outlet in the wall for the lead-in wires may occur almost anywhere underneath the backboard, therefore, it is necessary to provide a means for routing the connecting wires to various positions underneath said backboard. To this end, a space 47 is left between the lower ends of the upper inclined slots, and also the opposite edges of the terminal block 19 are spaced from the wall of the marginal rim 11 as indicated at 48. If perchance, the wires are to be lead from underneath the backboard 10 to a desk-type telephone, a space 49 is provided between the uppermost of the diverging slots 15 and also between the lower diverging slot 15 and the adjacent embossment 34 as indicated at 50, thence out through a slot 51 in the lowermost wall of rim 11.

FIGS. 8 and 9 show a modified construction where an adaptor frame may be provided for closing the space between the telephone casing terminal edge and the wall to which it is to be attached that uses less material than the first form; thus it is more economical to manufacture.

FIG. 8 shows a transverse sectional view through a portion of the backboard 10, and the base plate **26*a* attached thereto is of the size such as used for the small size telephone. In this case, it is to be noted that the nubs 35*a* will be disposed just outside the frame. The means for closing the space between the terminal edge of the telephone casing wall 25*b* and the support wall W consists merely of a rectangular-shaped frame 42 dimensioned to the size of the telephone it is to fit. The frame 42 is formed with an upstanding flange 43 throughout its entire length and is adapted to have a slip-fit with the inside of the wall of the telephone to which it is fitted. If desired, the wall flange 43 may be interrupted by space slots 44 providing a resilient lug 45 having an outwardly projecting rib 46** at the upper edge. The inner surface of the telephone walls will be provided with a complementary recess into which the ribs are adapted to have snap engagement for removably holding the frame to the terminal edge of the telephone wall.

FIG. 10 shows another modification where the wall **25*b* of the telephone casing may have an integral extension 42*a* of the wall itself, and takes the place of the removable frame 42 of FIG. 8. A break-line V-shaped groove 52 is provided all around the inside of the telephone casing defining the juncture of the wall 25a with the extension wall 42a. This wall 42a will normally close up the space that would exist between the telephone casing and the support wall W when the telephone is mounted on my improved backboard. If perchance, the telephone is to be mounted directly upon the support wall without the use of any backboard; i.e., by attaching the base plate 26 or 26a directly to the wall, then it would only be necessary to remove the integral extension 42a by breaking it away from the telephone casing along the break-line groove 52. If desired, the V-shaped groove 52** may be placed on the outside of the telephone casing. This would add a decorative effect to the casing and would also serve to minimize the overall depth of the telephone casing.

Whenever it becomes expedient to attach the backboard 10 directly to an outlet box shown in dot-and-dash outline as indicated at 41, provision is made for an adjustable cross-bar 53 slidably fitted within the backboard opening 14 (see FIGS. 2 and 6). To make the above attachment the outlet box is provided with oppositely extending lugs 56 with tapped holes 57 therein. Specifically, the cross-bar has a shoulder 54 at each opposite end that overlies and is adapted to ride along the top edge of the rim 11. The cross-bar is provided with an elongated slot 55 through which an attachment screw may be inserted anywhere along its length. As shown in FIG. 2, the backboard 10 can be attached in any number of positions upon the outlet box by reason of the inclined position of the slots 15 through which one of the attaching screws will pass for attachment to lower lug 56, and then the cross-bar will be slid to a position where its slot 55 will line up with the tapped hole 57 of the opposite lug and receive the second attaching screw. The cross-bar is also formed with cut-outs 55a in the underside of its spaced walls to facilitate the threading of the telephone lead-in wires from one position to another.

It is also within the purview of this invention to eliminate the diverging sets of slots 15 and 17 from the upper and lower panels 12 and 13, and make the large square opening 14 considerably longer; and instead of only one cross-bar 53, provide two cross-bars that can be adjusted in either direction in the larger opening. With such an arrangement, it will be evident that the installation of the backboard can adequately meet any and all contingencies that may be encountered when attaching the backboard to a supporting wall.

In case the wall-type telephone is shifted to a different position in the home, or is changed to a desk-type telephone, the backboard may be left on the wall and covered with an ornamental plate 58 as seen in FIG. 11. This plate will be of the same overall size as the backboard 10 and is formed with a depending flange 59 which is dimensioned to have a frictional slip fit into the backboard recess 37a. If desired, the face of the cover plate may be embossed or furnished with a suitable picture to enhance its appearance. When this change to a desk type telephone is made, the spade tips on the end of the telephone extension cord will be connected into the spring slips 22 in the usual manner. The extension cord will then be laid underneath the backboard 10 and guided between the space 49 left between the upper of the lower set of diverging slots 15, and the space 50 between the lower slot 15 and adjacent embossment 34, thence out through an opening 51 in the lower edge of the backboard 10.

Three forms of the invention are presented herein for the purpose of exemplification, but it will be appreciated that the invention is susceptible to other modified forms coming equally within the scope of the appended claims.

What I claim is:

1. A support mounting for a telephone of the type adapted to be attached to a support wall and wherein the telephone has a casing with a rear opening, said casing presenting a terminal edge, and a base plate serving to close the rear opening of the casing, the improvement consisting in providing a rectangular-shaped backboard of a size smaller than the length and width of said telephone casing, the relative position of the telephone casing when attached to the backboard by the base plate being such that an interposed space is left between the casing terminal edge and the support wall, and an adapter member for closing said interposed space to provide a finished appearance for the telephone mounting.

2. A support mounting as defined in claim 1 wherein the adaptor member for closing the interposed space consists of a rectangular frame having means for engagement with said telephone casing adjacent to its rear opening.

3. A support backboard assembly for a telephone of the type adapted to be attached to a support wall and wherein the telephone has a casing with a rear open end presenting a terminal edge and closed by a base plate, said assembly consisting of a backboard and an adaptor frame, said backboard comprising a rectangular frame and an integral panel, the size of the backboard frame being smaller than the length and width of the telephone casing, means for attaching the base plate to the backboard, the relative position of the telephone casing to the backboard being such that the terminal edge of said casing will be spaced from the support wall a distance substantially the thickness of the backboard, said adaptor frame having face plate interfitted with the backboard frame serving to close the interposed space between the telephone casing terminal edge and the support wall.

4. A support backboard assembly as defined in claim 3 wherein the backboard frame has a recess in its upper outside edge for receiving the inner edge of the adaptor frame.

5. A support backboard assembly for a telephone of the type adapted to be attached to a support wall and as defined in claim 4 wherein the adaptor frame is held in assembled position upon the backboard by reason of the base plate being secured to the backboard and resting against the front surface of the adaptor frame face plate.

6. A support backboard assembly as defined in claim 3 wherein the telephone base plate is provided with keyhole projections and nubs which projections and nubs rest against the face plate of this adaptor frame for holding the latter in assembled position.

7. A support backboard for a telephone of the type adapted to be attached to a support wall, the size of the backboard being smaller than the length and width of the telephone casing and consisting of a rectangular frame and integral upper and lower panels separated by a relatively large opening, said upper and lower panels having diverging slots therein through which screws may be inserted for attaching the backboard to the support wall.

8. A support backboard as defined in claim 7 wherein the elongated diverging slots are circumvented by depending flanges.

9. A support backboard as defined in claim 7 wherein an elongated embodiment having a shouldered channel is provided at one end of said backboard, and an attaching nut slidably fitted in said shouldered channel.

10. A support backboard as defined in claim 7 wherein one panel supports a depending terminal block adjacent the edge of the opening, said block having means for connection of the telephone wires and lead-in wires thereto.

11. A support backboard as defined in claim 10 wherein the means for attaching the wires consists of spring clips for receiving spade tips of the telephone wires and clip-type terminal connectors to which the lead-in wires may be attached.

12. A support backboard for a telephone of the type adapted to be attached to a support wall, said backboard consisting of a rectangular frame having integral upper and lower panels separated by a relatively large opening, one of said panels having diverging slots therein providing means through which a screw may be inserted as one of the anchor means for attaching the backboard to a support wall, and a transverse cross-bar interfitted with said frame and slidable lengthwise of said backboard, said cross-bar having a longitudinal slot through which a screw may be inserted as the other anchor means for attaching the back board to a support wall.

13. A support backboard assembly for a telephone of the type adapted to be attached to a support wall wherein the telephone has the usual casing closed by a base plate, said backboard consisting of a rectangular frame and an integral panel, the size of the backboard frame being smaller in length and width than that of the telephone casing, means for removably attaching the base plate to the backboard, the relative position of the telephone casing to the backboard being such that the edge of said casing will be spaced from the support wall a distance less than the thickness of the backboard, and an adaptor frame interfitted with either the backboard or the telephone casing for closing the interposed space.

References Cited

UNITED STATES PATENTS 3,182,805 5/1965 Foster et al. ---------- 211—26

WILLIAM C. COOPER, Primary Examiner

U.S. Cl. X.R.

211—26

UNITED STATES PATENT OFFICE

CERTIFICATE OF CORRECTION

Patent No. 3,470,330 September 30, 1969

George J. Brown

It is certified that error appears in the above identified patent and that said Letters Patent are hereby corrected as shown below:

Column 1, line 57, after "Another" insert -- object --. Column 6, line 27, before "face" insert -- a --; line 56, "embodiment" should read -- embossment --.

Signed and sealed this 27th day of October 1970.

(SEAL)
Attest:

Edward M. Fletcher, Jr.
Attesting Officer

WILLIAM E. SCHUYLER, JI
Commissioner of Patent